April 13, 1943.   H. MARUHN   2,316,269

INTERNAL COMBUSTION ENGINE

Filed May 5, 1939

INVENTOR
HERBERT MARUHN
BY
ATTORNEYS

Patented Apr. 13, 1943

2,316,269

UNITED STATES PATENT OFFICE 2,316,269

INTERNAL COMBUSTION ENGINE

Herbert Maruhn, Stuttgart-Bad Cannstatt, Germany; vested in the Alien Property Custodian Application May 5, 1939, Serial No. 271,980
In Germany May 5, 1938

11 Claims. (Cl. 123—33)

This invention relates to improvements in internal combustion engines, and more particularly to such engines which are provided with a pre-combustion chamber into which the fuel is injected in fluid form, and an ignition device for igniting the fuel within such a chamber.

An object of this invention is to provide a novel arrangement of the ignition device within the cylinder head of an internal combustion engine.

Another object of this invention is to provide a novel relationship between a fuel ignition device and the pre-combustion chamber of an internal combustion engine.

Still another object of this invention is the provision of forming the fuel ignition or glow device of an internal combustion engine as a unit with a jacket forming a pre-combustion chamber, independently of the cylinder head.

An additional object of this invention is to avoid the use of special sealing means between a fuel ignition or glow device for an internal combustion engine provided with a pre-combustion chamber, and a cylinder head enclosing the fuel ignition device.

A more specific object of this invention is to protect a fuel ignition or glow device of an internal combustion engine having a pre-combustion chamber, from the direct heat of the pre-combustion chamber wall.

Figure 1:
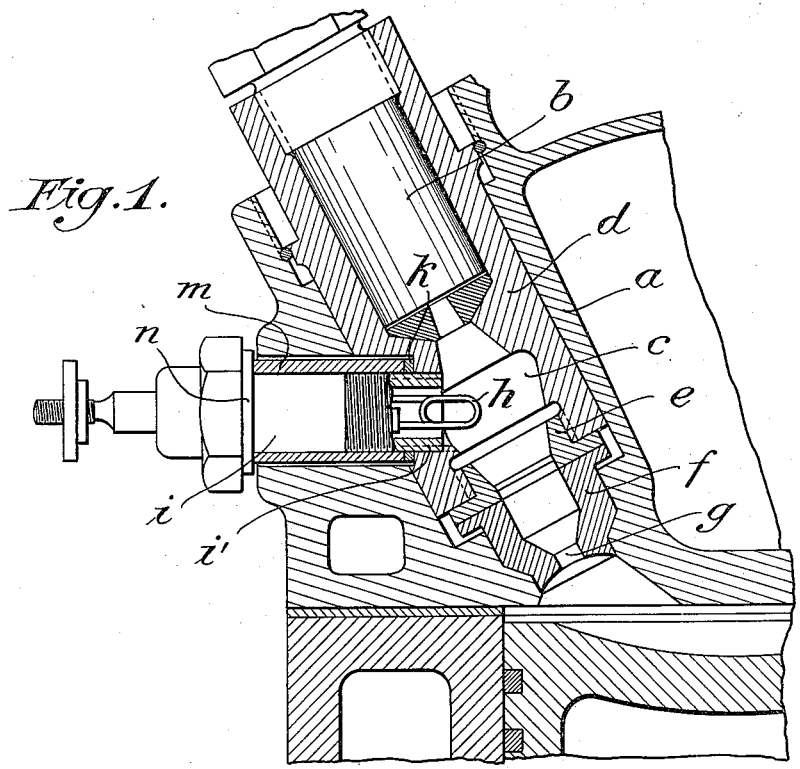
Figure 2:
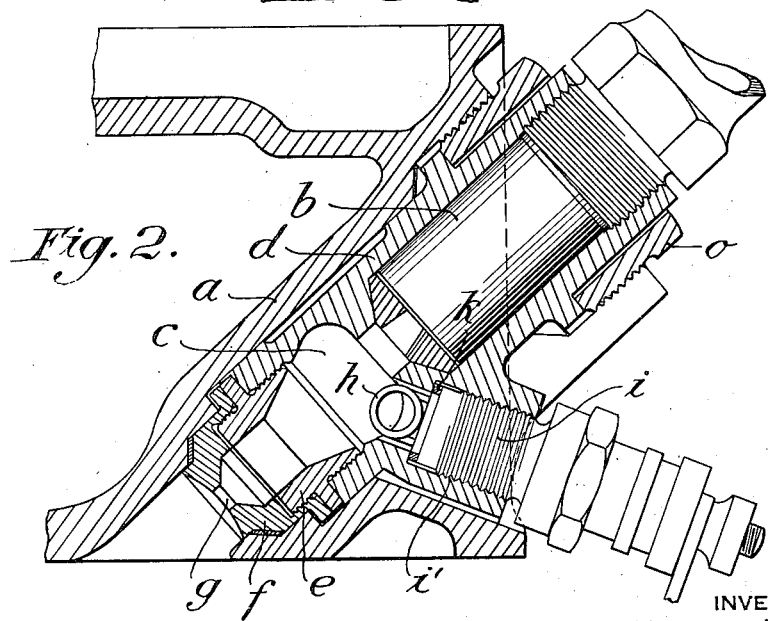

These and other features, capabilities and advantages of the invention will appear from the subjoined detailed description of one embodiment and a modification thereof, illustrated in the accompanying drawing, in which:

Fig. 1 is a partial longitudinal cross-sectional view of an internal combustion engine illustrating the arrangement of the pre-combustion chamber and the fuel ignition device within the cylinder head of an internal combustion engine; and Fig. 2 is a similar view of a modified arrangement.

In the form of invention illustrated in Fig. 1, a water-cooled cylinder head $a$ is provided with a fuel nozzle $b$ and a pre-combustion chamber $c$ made up of the sleeve-like interconnected parts $d$, $e$ and $f$. A port $g$ is adapted to interconnect a pre-combustion chamber with the main combustion space of the engine. heating or ignition element $h$ of the ignition device $i$ projects into the pre-combustion chamber $c$ and, more specifically, partially into the path of the fuel stream coming from the nozzle $b$, to cause ignition within this chamber as is well known in the art. The ignition device $i$ is provided with a threaded portion $i'$ which is screwed directly into a threaded opening in the portion $d$ of the sleeve forming the pre-combustion chamber. In this manner, the ignition device $i$ is supported directly by the walls of the pre-combustion chamber, and no sealing means between the ignition device and the cylinder head housing $a$ are necessary. At the same time, the heating element $h$ is to a large extent protected from the direct heat of the pre-combustion chamber walls, since it is surrounded by the portion $i'$ which, due to the threaded connection between it and the pre-combustion chamber walls, will not be as hot as these walls. As there is no waste space between the portion $d$ of the pre-combustion chamber and the threaded extension $i'$, the pre-combustion space itself is not materially enlarged, which, is of extreme importance, particularly in connection with small engines. The interior bore of the threaded extension $i'$ being of a comparatively small width, also prevents undue enlargement of the total pre-combustion chamber space.

It is preferable that suitable sealing between the ignition device and the sleeve surrounding the pre-combustion chamber be provided. Such means may take any form well known to the art, but preferably may consist of a sealing ring $k$ tightly fitting about the threaded extension $i'$ and pressed against the portion $d$ of the sleeve by a member $m$ held in place by a collar $n$. By this arrangement the necessity of exact fit of the heating device within the transverse bore of the cylinder head and exact machining of the collar $n$ are avoided.

The modified form of invention illustrated in Fig. 2 is similar to that shown in Fig. 1, except that in this case the heating element is assembled with the sleeve forming the pre-combustion chamber before insertion into the cylinder head. The sleeve portion $d$ is preferably formed with a lateral extension for supporting the heating element and, in order to permit assembly, the cylinder head will be provided with a slot adjacent to and communicating with the longitudinal bore, which will be just of sufficient size to receive this lateral projection. In this case the unitary pre-combustion chamber sleeve and heating element may be held in place by a nut $o$ threaded into the cylinder head and pressed against an extension upon the sleeve portion $d$.

As pointed out above, by mounting the heating element directly upon the sleeve portion forming the pre-combustion chamber, an additional joint between these members and the surrounding cylinder head is avoided, and thus a possible split is prevented which, because of heat expansion, may permit the penetration of gases from the pre-combustion chamber. Also, the size of the effective pre-combustion chamber is kept relatively small, which is of particular importance in engines of small power and small dimensions. Additionally, by positioning the heating or ignition element itself partially within an extension of the heating element, separate from the pre-combustion chamber walls, the element will be protected from overheating and the accumulation of undesired fuel deposit.

The invention is not intended to be limited to the two forms shown, which are to be understood as illustrative only and not as limiting, as various changes in construction arrangement may be made, all coming within the scope of the claims which follow.

I claim:

1. In an internal combustion engine, a cylinder head having a bore and a communicating slot substantially parallel thereto, a sleeve member including a pre-combustion chamber formed therein, mounted in said bore, a lateral projection on said sleeve slidably positioned within said slot, and a heating element mounted on said lateral projection and extending into said pre-combustion chamber.

2. In an internal combustion engine, an engine housing having a bore extending therethrough, and an opening extending through one side of the housing communicating with said bore, a sleeve inserted in said bore, which interiorly forms a combustion space and is surrounded by the walls of said bore, said sleeve having a transverse opening communicating with the opening in said housing, and a glow device mounted in and sealing said transverse opening and carried by said sleeve in said housing opening with play.

3. In an internal combustion engine, the combination according to claim 2, wherein the wall of the opening in said housing surrounds the glow device circumferentially, so that the glow device can only be connected with the sleeve in the direction of the housing opening and after insertion of the sleeve into said bore.

4. In an internal combustion engine, the combination according to claim 2, wherein the transverse opening of said sleeve is provided with threads, and the glow device is provided with corresponding threads at the end facing the sleeve, both parts being screwed together through said threads.

5. In an internal combustion engine, the combination according to claim 2, wherein the end of the glow device sealed in the sleeve contains a cut-out portion open toward the interior of the sleeve, and a glow element positioned at least partially in this cut-out portion.

6. In an internal combustion engine, the combination according to claim 2, wherein the sleeve has a lateral projection which extends into said opening of the engine housing, and in which furthermore the said transverse opening of the sleeve extends throughout this projection and the glow device is inserted in this transverse opening of the sleeve.

7. In an internal combustion engine, the combination according to claim 2, wherein the sleeve has a lateral projection which extends into the said opening of the engine housing, and in which furthermore said transverse opening of the sleeve extends throughout the projection, and the glow device is inserted in this transverse opening of the sleeve, and wherein the housing wall of the housing opening surrounds the glow device substantially only upon three sides, in contrast to which the fourth side of said housing opening is open in the axial direction of said bore toward the outside, as well as against said bore, so that the sleeve together with the glow device can be inserted into the same in the axial direction of said bore.

8. In an internal combustion engine, the combination according to claim 2, wherein the housing wall of said housing opening surrounds the glow device substantially only upon three sides, in contrast to which the fourth side is open in the axial direction of said bore toward the outside, as well as opposite said bore, so that the sleeve together with the glow device can be inserted into the same in the axial direction of said bore.

9. In an internal combustion engine, an engine casing having a first bore and a second bore transverse thereto, a sleeve member arranged in the first bore and including a precombustion chamber formed therein, and provided with an opening extending through the wall of the sleeve member co-axially with respect to the transverse bore, and a heating device extending through the transverse bore of the engine casing, protruding into the opening of the sleeve member and supported by said sleeve member, said heating device consisting of a jacket screwed into the opening of the sleeve member and having a hole open toward the precombustion chamber and a heating element arranged in the hole, substantially half of the heating element being surrounded by such jacket.

10. In an internal combustion engine, an engine housing having a substantially cylindrical bore extending therethrough, a sleeve inserted in said bore which interiorly forms a combustion space and is surrounded by the walls of said bore, said sleeve having a threaded transverse opening communicating with said bore, and a glow device having a threaded section mounted in and sealing said opening, said glow device being supported by said sleeve independently of said housing, and provided with a heating element having a portion surrounded by and spaced from said threaded section so that the latter forms a protecting shield, and another portion extending into said combustion space.

11. The combination according to claim 10, in which the inner end of the threaded section of said glow device is substantially flush with the inner wall of the sleeve forming the combustion space.

HERBERT MARUHN.